US012623644B2

(12) United States Patent
Johnson et al.

(10) Patent No.: US 12,623,644 B2
(45) Date of Patent: May 12, 2026

(54) VEHICLE BRAKE SYSTEM

(71) Applicant: Ford Global Technologies, LLC, Dearborn, MI (US)

(72) Inventors: Matthew Johnson, Toledo, OH (US); Colton Knopf, Canton, MI (US); Daniel Joseph Dunn, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1009 days.

(21) Appl. No.: 17/726,608

(22) Filed: Apr. 22, 2022

(65) Prior Publication Data

US 2023/0339444 A1 Oct. 26, 2023

(51) Int. Cl.
| | |
|---|---|
| *B60T 8/34* | (2006.01) |
| *B60T 7/04* | (2006.01) |
| *B60T 8/172* | (2006.01) |
| *B60T 8/50* | (2006.01) |
| *B60T 13/14* | (2006.01) |
| *B60T 13/68* | (2006.01) |
| *B60T 13/74* | (2006.01) |
| *B60T 17/02* | (2006.01) |

(52) U.S. Cl.
CPC .............. *B60T 8/344* (2013.01); *B60T 7/042* (2013.01); *B60T 8/172* (2013.01); *B60T 8/5025* (2013.01); *B60T 13/146* (2013.01); *B60T 13/686* (2013.01); *B60T 13/745* (2013.01); *B60T 17/02* (2013.01)

(58) Field of Classification Search
CPC ......... B60T 8/344; B60T 7/042; B60T 8/172; B60T 8/2025; B60T 8/5025; B60T 13/686; B60T 13/146; B60T 13/745; B60T 17/02; B60T 13/662

See application file for complete search history.

(56) References Cited

U.S. PATENT DOCUMENTS

| | | | | | |
|---|---|---|---|---|---|
| 5,999,868 | A | * | 12/1999 | Beno .................. | B60G 17/0165 280/5.514 |
| 6,389,341 | B1 | * | 5/2002 | Davis .................. | B60G 21/067 188/274 |

(Continued)

OTHER PUBLICATIONS

Shah, "Design and Implementation of Adaptive Brake Pressure Controller", Master of Science Thesis, Delft Center for Systems and Control, Delft University of Technology, Jan. 19, 2016.

*Primary Examiner* — Robert A. Siconolfi
*Assistant Examiner* — James K Hsiao
(74) *Attorney, Agent, or Firm* — Lorne Forsythe; Brooks Kushman P.C.

(57) ABSTRACT

A vehicle includes wheels, brakes to control speeds of the wheels, and a hydraulic fluid source in fluid communication with the brakes. The vehicle includes a computer storing instructions to determine that speeds of the wheels are zero and actuate the hydraulic fluid source to provide hydraulic fluid to a first set of one or more of the brakes at a first pressure sufficient to maintain the vehicle body at a present position and to provide hydraulic fluid at a volumetric rate to one or more of the brakes not in the first set, and, while providing hydraulic fluid at the volumetric rate to a brake not in the first set, detect second pressures of the brake not in the first set. The instructions include instructions to determine a volume-pressure curve for the brake not in the first set based on the volumetric rate and the second pressures.

20 Claims, 6 Drawing Sheets

(56)  References Cited

U.S. PATENT DOCUMENTS

| | | | | | |
|---|---|---|---|---|---|
| 7,076,351 | B2 * | 7/2006 | Hamilton | | F16F 9/466 |
| | | | | | 701/1 |
| 7,770,701 | B1 * | 8/2010 | Davis | | H01F 1/447 |
| | | | | | 188/267.1 |
| 8,706,375 | B2 | 4/2014 | Ajiro | | |
| 8,812,212 | B2 * | 8/2014 | Tomlinson | | B60T 13/662 |
| | | | | | 701/72 |
| 9,199,690 | B2 * | 12/2015 | Watarai | | B62K 25/04 |
| 9,988,025 | B2 | 6/2018 | Stelter | | |
| 10,173,653 | B2 | 1/2019 | Biller | | |
| 10,752,230 | B2 * | 8/2020 | Georgin | | B60T 8/172 |
| 2004/0026988 | A1 * | 2/2004 | Ewinger | | B60T 7/12 |
| | | | | | 303/20 |
| 2006/0254365 | A1 * | 11/2006 | Hamel | | G01B 17/04 |
| | | | | | 73/778 |
| 2009/0140501 | A1 * | 6/2009 | Taylor | | B60G 21/06 |
| | | | | | 280/5.508 |
| 2010/0324781 | A1 * | 12/2010 | Gagliano | | B60G 17/018 |
| | | | | | 701/39 |
| 2011/0022266 | A1 * | 1/2011 | Ippolito | | B60G 17/0195 |
| | | | | | 701/37 |
| 2011/0112774 | A1 * | 5/2011 | Gilles | | B60T 13/662 |
| | | | | | 73/39 |
| 2015/0166024 | A1 * | 6/2015 | Biller | | B60T 8/4081 |
| | | | | | 701/93 |
| 2016/0031506 | A1 * | 2/2016 | Lloyd | | B62K 3/00 |
| | | | | | 701/49 |
| 2016/0200164 | A1 * | 7/2016 | Tabata | | B60G 21/073 |
| | | | | | 280/5.508 |
| 2016/0311422 | A1 * | 10/2016 | van Zanten | | G01M 3/2869 |
| 2017/0217413 | A1 * | 8/2017 | Kutzner | | B60T 13/662 |
| 2017/0297545 | A1 * | 10/2017 | Kim | | B60T 8/172 |
| 2018/0065607 | A1 * | 3/2018 | Masuda | | B60T 8/58 |
| 2018/0111622 | A1 * | 4/2018 | Malone | | B60T 13/74 |
| 2018/0265068 | A1 * | 9/2018 | Heil | | B60T 11/103 |
| 2019/0232937 | A1 * | 8/2019 | Georgin | | G07C 5/006 |
| 2020/0010059 | A1 | 1/2020 | Busse | | |
| 2020/0114893 | A1 * | 4/2020 | Kim | | B60T 13/745 |
| 2021/0380089 | A1 * | 12/2021 | Dossi | | B60T 7/107 |

* cited by examiner

VEHICLE BRAKE SYSTEM

BACKGROUND

Vehicles typically includes a braking system that resists the motion of the vehicle to thereby slow and/or stop the vehicle. The braking system may include friction brakes such as disc brakes, drum brakes, band brakes, and so on; regenerative brakes; any other suitable type of brakes; or a combination. The braking system is in communication with and receives input from the computer and/or a human operator. The human operator may control the braking subsystem via, e.g., a brake pedal. The braking system may be actuated based on a volume-pressure curve that indicates a relationship between volume provided to a brake and pressure at such brake.

DETAILED DESCRIPTION

Figure 1:
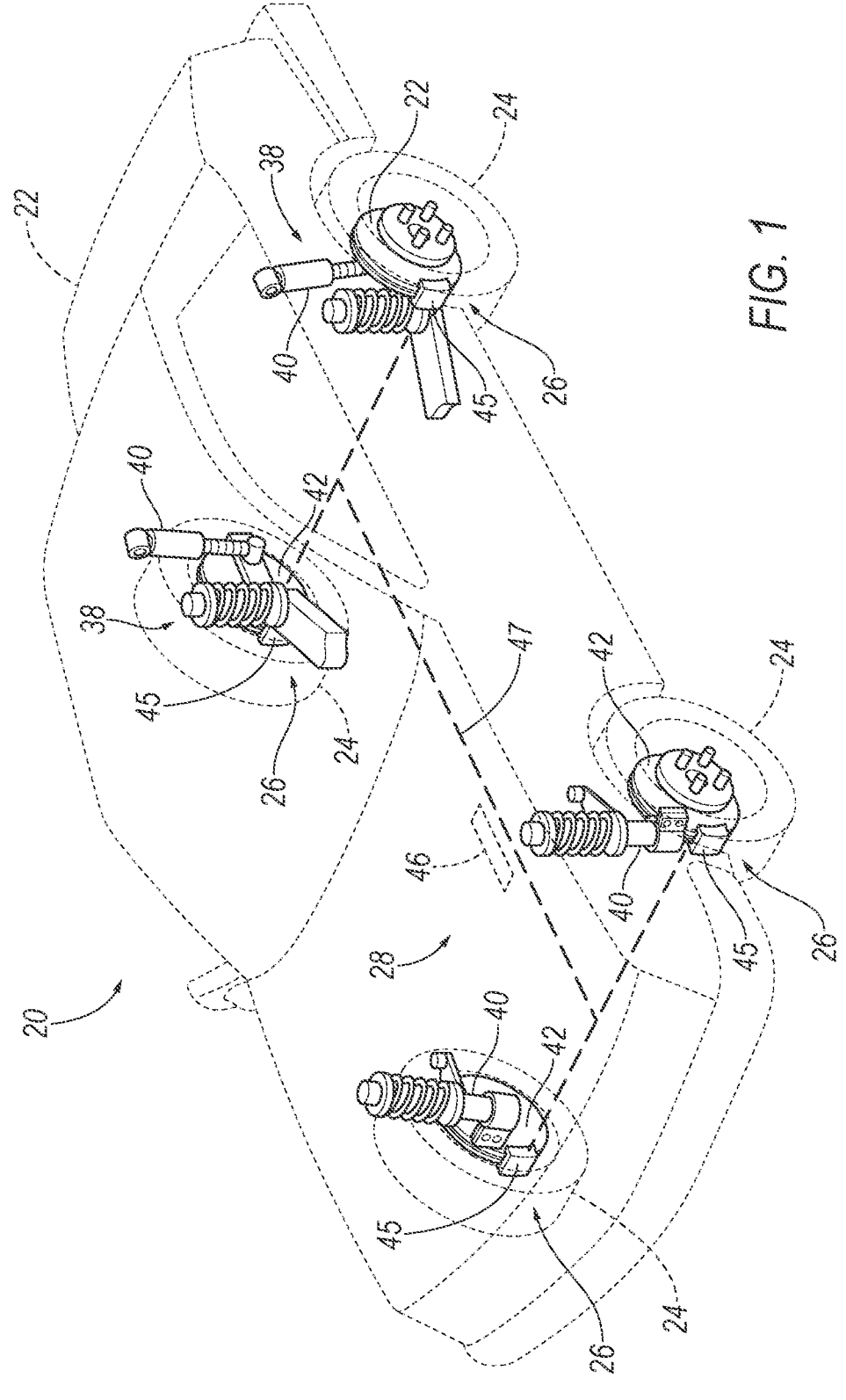
FIG. 1 is a perspective view of a vehicle with a plurality of brakes.

A vehicle includes a vehicle body and a plurality of wheels supported by the vehicle body. The vehicle includes a plurality of brakes operatively coupled to the wheels to control speeds of the wheels. The vehicle includes a hydraulic fluid source in fluid communication with the brakes. The vehicle includes a computer having a processor and a memory storing instructions executable by the processor to determine that speeds of the wheels are zero. The instructions include instructions to, after determining the speeds of the wheels are zero, actuate the hydraulic fluid source to provide hydraulic fluid to a first set of one or more of the brakes at a first pressure sufficient to maintain the vehicle body at a present position and to provide hydraulic fluid at a volumetric rate to one or more of the brakes not in the first set. The instructions include instructions to, while providing hydraulic fluid at the volumetric rate to a brake not in the first set, detect second pressures of the brake not in the first set. The instructions include instructions to determine a volume-pressure curve for the brake not in the first set based on the volumetric rate and the second pressures.

The instructions may include instructions to actuate the hydraulic fluid source to provide hydraulic fluid to the brake not in the first set based on the volume-pressure curve for the brake not in the first set.

The instructions may include instructions to, after determining the volume-pressure curve for the brake not in the first set, provide hydraulic fluid to a second set of one or more of the brakes at the first pressure sufficient to maintain the vehicle body at a present position and to provide hydraulic fluid at a volumetric rate to a brake not in the second set. The instructions may include instructions to, while providing hydraulic fluid at the volumetric rate to the brake not in the second set, detecting third pressures of the brake not in the second set. The instructions may include instructions to determine a second volume-pressure curve for the brake not in the second set based on the volumetric rate and the third pressures.

The first set and the second set may be different.

The hydraulic fluid source may include a pump and a plurality of valves operatively coupled between the pump and the brakes to control fluid flow from the pump to the brakes.

The instructions to actuate the hydraulic fluid source to provide hydraulic fluid to the first set of one or more of the brakes at the first pressure may include instructions to while a first set of one or more of the valves connecting the pump to the first set of one or more of the brakes are at an open position, actuating the pump to provide hydraulic fluid to the first set of one or more of the brakes at the first pressure, and, then, actuating the first set of valves to a closed position.

The instructions may include instructions to actuate the pump to provide hydraulic fluid at the volumetric rate to the brake not in the first set and detect the second pressures of the brake not in the first set while the first set of valves are at the closed position.

Each of the brakes may include a disc, and brake pad, and a caliper operative to control movement of the brake pad relative to the disc.

The volume-pressure curve may include a first portion corresponding to movement of the pad prior to contact with the disc and a second portion corresponding to subsequent the pad contacting the disc.

The instructions may include instructions to, in response to determining the speeds of the wheels are zero and before actuating the hydraulic fluid source to provide hydraulic fluid to the first set of one or more of the brakes at the first pressure, predict that the vehicle body will be at the present position for a predetermined amount of time.

A vehicle includes a vehicle body and a plurality of wheels supported by the vehicle body. The vehicle includes a plurality of brakes operatively coupled to the wheels to control speeds of the wheels. The vehicle includes a hydraulic fluid source in fluid communication with the brakes. The vehicle includes a computer having a processor and a memory storing instructions executable by the processor to determine the vehicle is in a park mode. The instructions include instructions to, in response to determining the vehicle is in the park mode, actuate the hydraulic fluid source to provide hydraulic fluid at a volumetric rate to one of the brakes. The instructions include instructions to, while providing hydraulic fluid at the volumetric rate to the one of the brakes, detect pressures of the one or more of the brakes. The instructions include instructions to determine a volume-pressure curve for the one of the brakes based on the volumetric rate and the detected pressures.

The instructions may include instructions to actuate the hydraulic fluid source to provide hydraulic fluid to the one of the brakes based on the volume-pressure curve for the one of the brakes.

The instructions may include instructions to after determining the volume-pressure curve for the one of the brakes, provide hydraulic fluid to a second of the brakes at the volumetric rate. The instructions may include instructions to, while providing hydraulic fluid at the volumetric rate to the second of the brakes, detect second pressures of the second of the brakes. The instructions may include instructions to determine a second volume-pressure curve for the second of the brakes based on the volumetric rate and the second pressures.

The hydraulic fluid source may include a pump and a plurality of valves operatively coupled between the pump and the brakes to control fluid flow from the pump to the brakes.

The instructions to actuate the hydraulic fluid source to provide hydraulic fluid at a volumetric rate to the one of the brakes may include instructions to command a valve of the plurality of valves corresponding to the one of the brakes to an open position and valves of the plurality of valves corresponding to another one or more of the brakes to a closed position.

Each of the brakes may include a disc, and brake pad, and a caliper operative to control movement of the brake pad relative to the disc.

The volume-pressure curve may include a first portion corresponding to movement of the pad prior to contact with the disc and a second portion corresponding to subsequent the pad contacting the disc.

A method includes determining that speeds of wheels of a vehicle are zero. The method includes, after determining the speeds of the wheels are zero, actuating the hydraulic fluid source to provide hydraulic fluid to a first set of one or more of the brakes at a first pressure sufficient to maintain the vehicle body at a present position and to provide hydraulic fluid at a volumetric rate to one or more of the brakes not in the first set. The method includes, while providing hydraulic fluid at the volumetric rate to a brake not in the first set, detecting second pressures of the brake not in the first set. The method includes determining a volume-pressure curve for the brake not in the first set based on the volumetric rate and the second pressures. The method includes actuating the brake not in the first set based on the volume-pressure curve.

Actuating the hydraulic fluid source to provide hydraulic fluid to the first set of one or more of the brakes at the first pressure may include, while a first set of one or more of the valves connecting the pump to the first set of one or more of the brakes are at an open position, actuating the pump to provide hydraulic fluid to the first set of one or more of the brakes at the first pressure, and, then, actuating the first set of valves to a closed position.

The volume-pressure curve may include a first portion corresponding to movement of a brake pad prior to contact with a brake disc and a second portion corresponding to subsequent the brake pad contacting the brake disc.

A vehicle includes a vehicle body and a plurality of wheels supported by the vehicle body. The vehicle includes a plurality of brakes operatively coupled to the wheels to control speeds of the wheels. The vehicle includes a hydraulic fluid source in fluid communication with the brakes. The vehicle includes a computer having a processor and a memory storing instructions executable by the processor to collect data indicating at least one of detected steering angles, wheel angles, wheel speeds, damper movements, and lateral body accelerations. The instructions include instructions to predict, based on the collected data and using a trained neural network, a knockback portion of a volume-pressure curve for at least one brake of the plurality of brakes. The instructions include instructions to actuate the hydraulic fluid source to provide fluid to at least one brake of the plurality of brakes based on the predicted knockback portion.

The instructions may include instruction to measure knockback of the at least one brake of the plurality of brakes while actuating the hydraulic fluid source to provide fluid to the at least one brake of the plurality of brakes based on the predicted knockback portion, and to update training of the trained neural network based on the measured knockback of the at least one brake of the plurality of brakes and the collected data.

The collected data may include data indicating the wheel speeds of at least two wheels of the plurality of wheels.

The collected data may include data indicating at least two of the detected steering angles, the wheel angles, the wheel speeds, the damper movements, and the lateral body accelerations.

The collected data may include data indicating at least three of the detected steering angles, the wheel angles, the wheel speeds, the damper movements, and the lateral body accelerations.

The collected data may include data indicating at least four of the detected steering angles, the wheel angles, the wheel speeds, the damper movements, and the lateral body accelerations.

The collected data may include data indicating the detected steering angles, the wheel angles, the wheel speeds, the damper movements, and the lateral body accelerations.

The collected data may include data collected after a most recent actuation of the at least one brake of the plurality of brakes.

The collected data may not include data collected prior to the most recent actuation of the at least one brake of the plurality of brakes.

The collected data may include data indicating the damper movements of a damper corresponding to the at least one brake of the plurality of brakes.

The data indicating the damper movements may include data indicating a magnitude of length change of the damper.

A computer includes a processor and a memory storing instructions executable by the processor to collect data indicating at least one of detected steering angles, wheel angles, wheel speeds, damper movements, and lateral body accelerations. The instructions include instructions to predict, based on the collected data and using a trained neural network, a knockback portion of a volume-pressure curve for at least one brake of the plurality of brakes. The instructions include instructions to actuate the hydraulic fluid source to provide fluid to at least one brake of the plurality of brakes based on the predicted knockback portion.

The instructions may include instruction to measure knockback of the at least one brake of the plurality of brakes while actuating the hydraulic fluid source to provide fluid to the at least one brake of the plurality of brakes based on the predicted knockback portion, and to update training of the trained neural network based on the measured knockback of the at least one brake of the plurality of brakes and the collected data.

The collected data may include data indicating at least four of the detected steering angles, the wheel angles, the wheel speeds, the damper movements, and the lateral body accelerations.

The collected data may include data collected after a most recent actuation of the at least one brake of the plurality of brakes and does not include data collected prior to the most recent actuation of the at least one brake of the plurality of brakes.

The collected data may include data indicating the damper movements of a damper corresponding to the at least one brake of the plurality of brakes.

A method includes collecting data indicating at least one of detected steering angles, wheel angles, wheel speeds, damper movements, and lateral body accelerations. The method includes predicting, based on the collected data and using a trained neural network, a knockback portion of a volume-pressure curve for at least one brake of the plurality of brakes. The method includes actuating the hydraulic fluid source to provide fluid to at least one brake of the plurality of brakes based on the predicted knockback portion.

The method may include measuring knockback of the at least one brake of the plurality of brakes while actuating the hydraulic fluid source to provide fluid to the at least one brake of the plurality of brakes based on the predicted knockback portion, and updating training of the trained neural network based on the measured knockback of the at least one brake of the plurality of brakes and the collected data.

The collected data may include data indicating at least four of the detected steering angles, the wheel angles, the wheel speeds, the damper movements, and the lateral body accelerations.

The collected data may include data collected after a most recent actuation of the at least one brake of the plurality of brakes and does not include data collected prior to the most recent actuation of the at least one brake of the plurality of brakes.

With reference to the Figures, and where like numerals indicate like features throughout the several views a vehicle 20 is shown. The vehicle 20 includes a vehicle body 22. The vehicle 20 includes a plurality of wheels 24 supported by the vehicle body 22. The vehicle 20 includes a plurality of brakes 26 operatively coupled to the wheels 24 to control speeds of the wheels 24. The vehicle 20 includes a hydraulic fluid source 28 in hydraulic fluid communication with the brakes 26. The vehicle 20 includes a computer 30 having a processor and a memory storing instructions executable by the processor to determine that speeds of the wheels 24 are zero. The instructions include instructions to, after determining the speeds of the wheels 24 are zero, actuate the hydraulic fluid source 28 to provide hydraulic fluid to a first set of one or more of the brakes 26 at a first pressure sufficient to maintain the wheels 24 at the speed of zero and provide hydraulic fluid at a volumetric rate to one or more of the brakes 26 not in the first set. The instructions include instructions to, while providing hydraulic fluid at the volumetric rate to a brake 26 not in the first set, detect second pressures of the brake 26 not in the first set. The instructions include instructions to determine a volume-pressure curve VPC for the brake 26 not in the first set based on the volumetric rate and the second pressures. The instructions may include instructions to collect data indicating at least one of detected steering angles, wheel angles, wheel speeds, damper movements, and lateral body accelerations; and to predict, based on the collected data and using a trained neural network, a knockback portion of a volume-pressure curve for at least one brake of the plurality of brakes. The instructions may include instructions to actuate the hydraulic fluid source to provide fluid to at least one brake of the plurality of brakes based on the determined volume-pressure curve VPC and the predicted knockback portion.

The volume-pressure curve VPC indicates a pressure generated in the brake 26 for various volumes of hydraulic fluid to the brake 26. The computer 30 may use the volume-pressure curve VPC to determine an amount of hydraulic fluid to provide to the brake 26 to produce a certain pressure in the brake 26. Design, manufacturing tolerances, and environment use factors during normal operation of the vehicle 20 affect the volume-pressure curve VPC and the knockback portion. Determining the volume-pressure curve VPC for the brake 26 when the vehicle 20 is stopped and predicting the knockback portion the enables the volume-pressure curve VPC to have an increased accuracy, e.g., compared to a volume-pressure curve VPC that is prestored in the memory of the computer 30 upon initial manufacture of the vehicle 20. Increasing accuracy of the volume-pressure curve VPC may provide increase performance, e.g., increasing comfort of occupants, decreasing an amount of wear of the brake 26, etc.

The vehicle 20 may be any suitable type of ground vehicle, e.g., a passenger or commercial automobile such as a sedan, a coupe, a truck, a sport utility, a crossover, a van, a minivan, a taxi, a bus, etc.

The vehicle 20 can include a system or systems for autonomously or semi-autonomously operating the vehicle 20, e.g., an advanced driver assist system ADAS for speed control, lane-keeping, etc. As another example, the computer 30 may operate a propulsion system 32, a steering system 34, and/or a braking system 36 of the vehicle 20 with limited and/or no input from a human operator.

The vehicle 20 may be in a park mode or a drive mode. The vehicle 20 in the park mode is stationary and torque from the propulsion system 32 is not provided to wheels 24 of the vehicle 20. For example, a parking pawl of a transmission of the propulsion system 32 may be engaged, one or more clutches of the transmission may be disengaged to inhibit transfer of torque, a parking brake may be engaged, etc. The vehicle 20 in the drive mode may be movable, e.g., in a forward or reverse direction, and torque from the propulsion system 32 is providable to wheels 24 of the vehicle 20. For example, the parking pawl may be disengaged, one or more clutches may be engaged to provide transfer of toque, the parking brake may be disengaged, etc.

The vehicle 20 includes the vehicle body 22 and frame. The vehicle body 22 and frame may be of a unibody construction in which the frame is unitary with the body 22 including frame rails, pillars, roof rails, etc. As another example, the body 22 and frame may have a body-on-frame construction also referred to as a cab-on-frame construction in which the body 22 and frame are separate components, i.e., are modular, and the body 22 is supported on and affixed to the frame. Alternatively, the frame and body 22 may have any suitable construction. The frame and body 22 may be of any suitable material, for example, steel, aluminum, and/or fiber-reinforced plastic, etc.

The wheels 24 are supported by the vehicle body 22. The wheels 24 may rotate relative to the body 22 of the vehicle 20. The wheels 24 may control forward and/or rearward movement of the vehicle 20, e.g., via torque applied to the wheels 24 from the propulsion system 32 and/or the braking system 36, and/or via turning the wheels 24 to the right or the left with the steering system 34.

The vehicle 20 includes a suspension system 38. The suspension system 38 is coupled to the frame and body 22 and to each wheel 24 assembly. The suspension system 38 absorbs and dampens shocks and vibrations from the wheels 24 to the frame and body 22. For each wheel 24, the suspension system 38 may include an upper control arm, a lower control arm, a coil spring, and a damper 40. The dampers 40 may extend through the coil springs. One end of the damper 40 and the coil spring may be connected to the lower control arm, and the other end of the damper 40 and the coil spring may be connected to the upper control arm or to the frame and body 22. The suspension system 38 is arranged so that an upward motion of the wheel 24, such as when the tire hits a bump while the vehicle 20 is in motion, compresses the coil spring and the damper 40. The coil spring may exert a force that is a function, e.g., a linear relation, of a difference between the current length of the coil spring and a relaxed length of the coil spring. The damper 40 may exert a force that is a function of a speed of compression or extension of the damper 40. The suspension system 38 may be an active suspension with controllable damper firmness and ride height. The suspension system 38 may be in communication with and receives input from the computer 30, e.g., to control damper firmness and ride height.

The propulsion system 32 provides torque to one or more of the wheels 24. The propulsion system 32 may include one or more of an internal combustion engine, electric motor, hybrid engine, etc. The propulsion system 32 is in communication with and receives input from the computer 30 and/or a human operator.

The steering system 34 controls the turning of the wheels 24, e.g., toward a right or left of the vehicle 20. The steering system 34 may include a rack-and-pinion system with electric power-assisted steering, a steer-by-wire system, e.g., such as are known, or any other suitable system. The steering system 34 is in communication with and receives input from a steering wheel and/or the computer 30.

The braking system 36 resists the motion of the vehicle 20 to thereby slow and/or stop the vehicle 20. The braking system 36 includes the brakes 26, the hydraulic fluid source 28, and/or any other suitable structure. The braking system 36 is in communication with and receives input from the computer 30 and/or a human operator. The human operator may control the braking system 36 via, e.g., a brake pedal.

The brakes 26 of the braking system 36 control, e.g., reduce, rotational speed of the wheels 24. Each of the brakes 26 may be operatively coupled to a respective one of the wheels 24 to control the speed of such wheel 24. For example, a right-front brake 26 may be operatively coupled to a right-front wheel 24, a left-front brake 26 may be operatively coupled to a left-front wheel 24, a right-rear brake 26 may be operatively coupled to a right-rear wheel 24, and a left-rear brake 26 may be operatively coupled to a left-rear wheel 24.

Figures 2, 3:
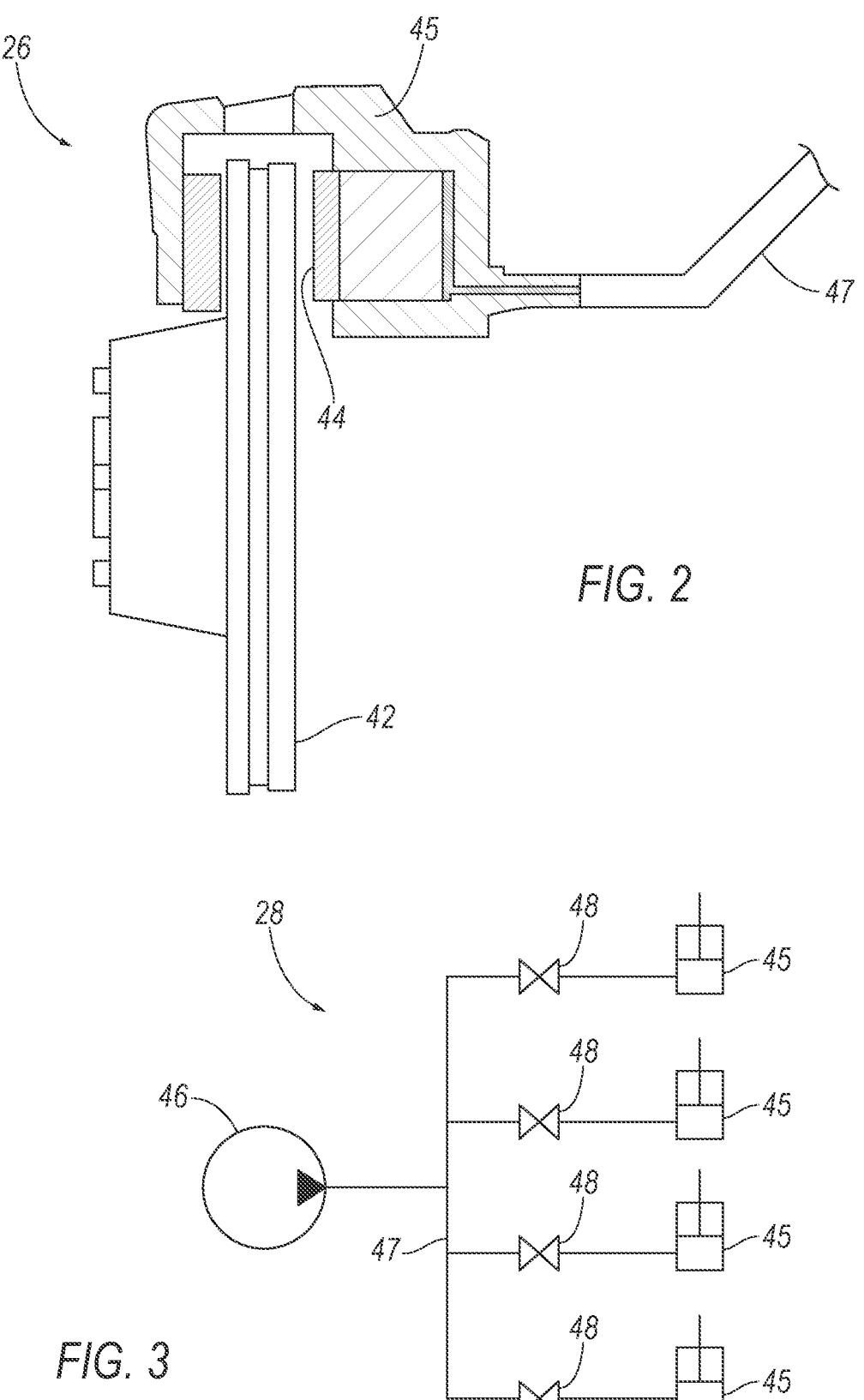
FIG. 2 is a partial cross section of one of the brakes.
FIG. 3 is a schematic of a hydraulic fluid source for the brakes.

With reference to FIG. 2, each of the brakes 26 includes a disc 42, a brake pad 44, and a caliper 45 operative to control movement of the brake pad 44 relative to the disc 42, e.g., as known. The disc 42 may be rotationally fixed relative the respective wheel 24 and the caliper 45 and the brake pad 44 attached thereto may be rotationally fixed relative to the body 22. Increasing and decreasing hydraulic fluid provided to the caliper 45 may urge the brake pad 44 toward or away from the respective disc 42. For example, increasing an amount of hydraulic fluid provided to the caliper 45 may move the move the brake pad 44 into contact with the disc 42 and increase rotational resistance applied to the wheel 24 by the brake 26. As another example, decreasing an amount of hydraulic fluid provided to the caliper 45 may move the move the brake pad 44 out of contact with the disc 42 and decrease rotational resistance applied to the wheel 24 by the brake 26.

With reference to FIG. 3, the hydraulic fluid source 28 controls an amount of hydraulic fluid provided to the brakes 26, e.g., in response to an instruction from the computer 30. The hydraulic fluid source 28 may individually and selectively control the amount of hydraulic fluid provided to each the brakes 26. For example, the hydraulic fluid source 28 may increase or decrease the hydraulic fluid provided to one of the brakes 26 and not to others. The hydraulic fluid source 28 is in hydraulic fluid communication with the brakes 26, e.g., via hydraulic fluid lines 47 or the like. The hydraulic fluid source 28 provide hydraulic fluid to one or more of the brakes 26 in response to a command from the computer 30.

The hydraulic fluid source 28 may include a pump 46 actuatable to increase or decrease the amount of hydraulic fluid provided by the hydraulic fluid source 28. The pump 46 may provide a specific amount of hydraulic fluid. The pump 46 may provide hydraulic fluid at a specific rate. The pump 46 may include a piston and cylinder arrangement, e.g., a master cylinder. The pump 46 may include a linear actuator operatively coupled to the piston to control movement of the piston via a change of length of the linear actuator. Movement of the piston by the linear actuator controls the amount of hydraulic fluid provided by the hydraulic fluid source 28. The pump 46 may include any other suitable structure for pumping hydraulic fluid. The pump 46 may be in fluid communication with a reservoir (not shown) that stores hydraulic fluid of the hydraulic fluid source 28.

The hydraulic fluid source 28 may include a plurality of valves 48 operatively coupled between the pump 46 and the brakes 26 to control hydraulic fluid flow from the pump 46 to the brakes 26. Individual valves 48 of the plurality may be arranged between the pump 46 and each of the brakes 26. For example, a first valve 48 may be arranged between the pump 46 and the left-front brake 26, a second valve 48 may be arranged between the pump 46 and the right-front brake 26, a third valve 48 may be arranged between the pump 46 and the left-rear brake 26, and a fourth valve 48 may be arranged between the pump 46 and the right-rear brake 26. The hydraulic fluid source 28 may include more than four valves 48, e.g., twelve valves as in known braking systems.

Each of the valves 48 may be movable to an open state permitting hydraulic fluid to flow therethrough and to a closed state inhibiting hydraulic fluid flow. The valves 48 may include, for example, tappet valves, ball valves, buttery valves, needle valves, etc. Each valve 48 may include a solenoid or other suitable structure for actuating the valve 48 to the open state and/or the closed state, e.g., in response to receiving a command from the computer 30.

Figure 4:
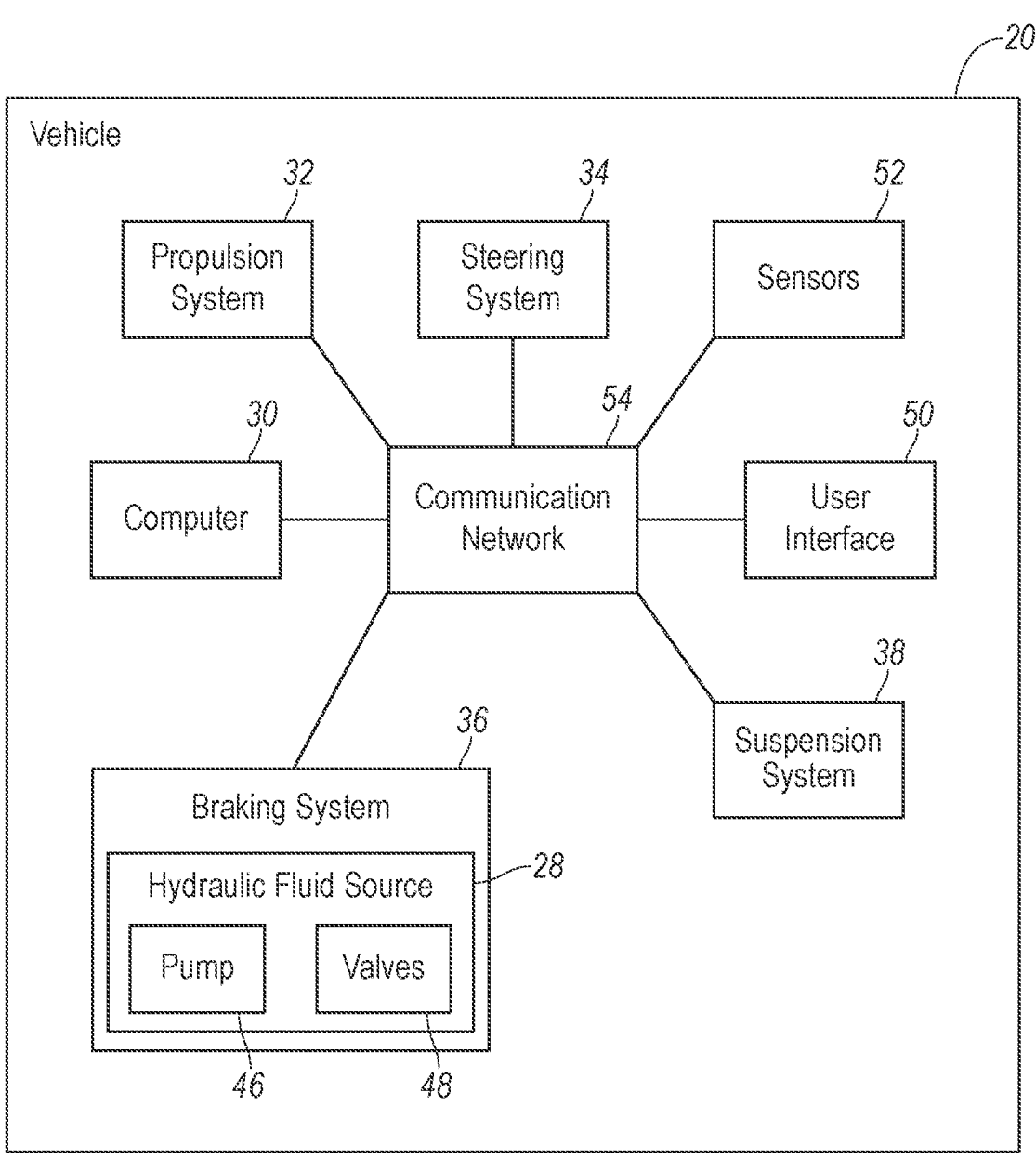
FIG. 4 is a block diagram of components of the vehicle.

With reference to FIG. 4, the vehicle 20 includes at least one user interface 50 that receives information from an occupant of the vehicle 20. The user interface 50 may be located, e.g., on an instrument panel in a passenger cabin of the vehicle 20, a steering wheel column, a center column between a pair of seats, or wherever may be readily seen by the occupant. The user interface 50 may include buttons, levers (such as a gear selection level), knobs, keypads, and so on for receiving information from the occupant.

The vehicle 20 includes a variety of sensors 52. A sensor 52 is a device that can obtain one or more measurements of one or more physical phenomena. The sensors 52 may detect internal states of the vehicle 20, for example, wheel speed, steering angles (i.e., rotational position of the steering wheel), wheel angles (i.e., an angular position of the wheels 24 to the right or left relative to center), movements of the dampers 40 (e.g., rates and magnitudes of compression and rebound movements), pressures of hydraulic fluid provided to each of the brakes 26, a mode of the vehicle 20 (e.g., whether the vehicle 20 is in the park mode or the drive mode), and engine and transmission variables. Some sensors 52 detect the position, orientation, and or accelerations of the vehicle 20 (e.g., longitudinal and/or lateral accelerations of the body 22 of the vehicle 20). The sensors 52 may include, for example, global positioning system GPS sensors; accelerometers such as piezo-electric or microelectromechanical systems MEMS; gyroscopes such as rate, ring laser, or fiber-optic gyroscopes; pressure sensors, strain gauges, inertial measurements units IMU; hall effect sensors, switches, magnetometers and other suitable structures. The sensors 52 may include communications devices, for example, vehicle-to-infrastructure V2I or vehicle-to-vehicle V2V devices via wireless communications cellular, DSRC., etc.

The computer 30 includes a processor and a memory. The memory includes one or more forms of computer readable media, and stores instructions executable by the processor for performing various operations and processes, including as disclosed herein. For example, the computer 30 can be a generic computer with a processor and memory as described above, may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, the computer 30 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the computer 30. The memory can be of any type, e.g., hard disk drives, solid state drives, servers, or any volatile or non-volatile media. The memory can store the collected data sent from the sensors 52. The memory can be a separate device from the computer 30, and the computer 30 can retrieve information stored by the memory via a communication network 54, e.g., over a CAN bus, a wireless network, etc. Alternatively or additionally, the memory can be part of the computer 30, e.g., as a memory of the computer 30. The computer 30 may include or be communicatively coupled to, e.g., via the communication network 54 such as a communications bus as described further below, more than one processor, e.g., included in components such as the sensors 52, electronic control units (ECUs) or the like included in the vehicle 20 for monitoring and/or controlling various components of the vehicle 20, e.g., a powertrain controller, a brake controller, a steering controller, etc. The computer 30 is generally arranged for communications on the communication network 54 that can include a bus in the vehicle 20 such as a controller area network CAN or the like, and/or other wired and/or wireless mechanisms. Alternatively or additionally, in cases where the computer 30 actually comprises a plurality of devices, the communication network 54 may be used for communications between devices represented as the computer 30 in this disclosure. Further, as mentioned below, various controllers and/or the sensors 52 may provide data to the computer 30 via the communication network 54.

The communication network 54 is a network via which messages can be exchanged between various devices in vehicle 20. The computer 30 is in electronic communication with, and can be generally programmed to send and/or receive, via the communication network 54, messages and other information to and/or from other devices in vehicle 20 e.g., any or all of the sensors 52, the braking system 36 (including the hydraulic fluid source 28 having the pump 46 and the valves 48), the propulsion system 32, the steering system 34, the user interface 50, etc. In some implementations, the communication network 54 can be a network in which messages are conveyed via a vehicle communications bus. For example, the communication network 54 can include a controller area network CAN in which messages are conveyed via a CAN bus, or a local interconnect network LIN in which messages are conveyed via a LIN bus. In some implementations, the communication network 54 can include a network in which messages are conveyed using other wired communication technologies and/or wireless communication technologies e.g., Ethernet, WiFi, Bluetooth, etc. Additional examples of protocols that may be used for communications over the communication network 54 in some implementations include, without limitation, Media Oriented System Transport MOST, Time-Triggered Protocol TTP, and FlexRay. In some implementations, the communication network 54 can represent a combination of multiple networks, possibly of different types, that support communications among devices in vehicle 20. For example, the communication network 54 can include a CAN in which some devices in the vehicle 20 communicate via a CAN bus, and a wired or wireless local area network in which some devices in the vehicle 20 communicate according to Ethernet or Wi-Fi communication protocols.

The computer 30 is programmed to, i.e., the memory stores instruction executable by the processor to, determine speeds of the wheels 24, including determining that the speeds of the wheels 24 are zero. The computer 30 may determine the speeds of the wheels 24 based on information from the sensors 52, e.g., received via the communication network 54. The computer 30 may determine speeds of the wheels 24 individually, e.g., based on data from sensors 52 at each of the wheels 24. The computer 30 may determine the speeds of the wheels 24 are zero when information from the sensors 52, e.g., from wheel speed sensors at each of the wheels 24, indicates that the wheels 24 are rotationally stationary relative to the body 22.

The computer 30 may be programmed to predict whether or not the speed the vehicle 20 will remain at zero for a predetermined amount of time. In other words, the computer 30 may be programmed to predict whether the vehicle 20 will be stopped for the predetermined amount of time. The predetermined amount of time may be, for example, an amount of time necessary to determine the volume-pressure curve VPC of at least one of the brakes 26, e.g., as described below. The computer 30 may predict whether or not the speed of the vehicle 20 will remain at zero for the predetermined amount of time based on data from the sensors 52. For example, the computer 30 may determine the vehicle 20 will be stopped for the predetermined amount of time in response to receiving data from a GPS sensor or camera indicating that the vehicle 20 is at a stop light. As another example, the computer 30 may determine the vehicle 20 will be stopped for the predetermined amount of time in response to receiving data via V2V communications or I2V communications indicating that traffic would inhibit movement of the vehicle 20 for the predetermined amount of time.

The computer 30 may be programmed to determine a mode of the vehicle 20, e.g., whether the vehicle 20 is in the park mode or the drive mode. The computer 30 may determine the vehicle 20 is in the park mode or the drive mode based on information from the user interface 50 and/or the sensors 52. For example, the computer 30 may receive information from the user interface 50, e.g., via the communication network 54, indicating the drive mode or the park mode, e.g., depending on a position of a gear selection knob of the user interface 50. As another example, the computer 30 may determine the vehicle 20 is in the park mode or the drive mode based on a selection of one of such modes by the computer 30, e.g., operating in the autonomous mode. As another example, the computer 30 may determine the vehicle 20 is in the park mode or the drive mode based on information from the sensors 52 indicating whether the parking pawl is engaged, the parking brake 26 is engaged, a clutch of the propulsion system 32 is engaged, etc.

The computer 30 is programmed to actuate the hydraulic fluid source 28 to provide hydraulic fluid to one or more of the brakes 26. The computer 30 may provide hydraulic fluid individually to each of brakes 26. For example, the computer 30 may increase or decrease hydraulic fluid pressure at one of the brakes 26 and not others. The computer 30 may provide hydraulic fluid to one or more sets of the brakes 26, e.g., to a set that includes only the front brakes 26, only the rear brakes 26, all but one of the brakes 26 (e.g., brakes 26 at three of the four wheels 24), etc.

The computer 30 may actuate the hydraulic fluid source 28 to provide hydraulic fluid to one or more of the brakes 26 by transmitting one or more commands to the hydraulic fluid source 28 via the communication network 54. The commands may instruct one or more of the valves 48 to the open position or the closed position. The commands may instruct the pump 46 to provide or remove hydraulic fluid from the lines 47 connecting the pump 46 to the brakes 26, e.g., thereby increasing or decreasing hydraulic fluid pressure in the lines 47. For example, the computer 30 may increase the resistance to rotation of the right-front wheel 24 by first commanding the valve 48 between the pump 46 and the brake 26 at the right-front wheel 24 to the open position. With such valve 48 in the open position, the computer 30 may command the pump 46 to provide hydraulic fluid, e.g., at a specified rate. The computer 30 may command the pump 46 to continue to provide hydraulic fluid until a certain amount of hydraulic fluid has been provided and/or until a certain pressure is detected in the lines 47. The computer 30 may maintain hydraulic fluid pressure and the resistance to rotation of the right-front wheel 24 by commanding the valve 48 between the pump 46 and the brake 26 at the right-front wheel 24 to the closed position.

The computer 30 may actuate the hydraulic fluid source 28 to provide hydraulic fluid to one or more of the brakes 26 based on one or more volume-pressure curves VPC for the brakes 26. The volume-pressure curves VPC specify a relationship between volumes of hydraulic fluid provided to the brakes 26 and a corresponding pressure of such hydraulic fluid, e.g., as the pad 44 moves into contact with the disc 42. The computer 30 may use the volume-pressure curves VPC to determine an amount of hydraulic fluid to provide the brakes 26 and/or to determine a rate at which to provide the hydraulic fluid, e.g., to achieve a certain amount of resistance to rotation, to quickly move the pad 44 into contact with the disc 42, to control an amount of jerk experienced by an occupant of the vehicle 20, etc., including known methodologies. The volume-pressure curves VPC may be stored in memory of the computer 30. The memory may store individual curves for each of the brakes 26, e.g., a first volume-pressure curve VPC for the right-front brake 26, a second volume-pressure curve VPC for the left-front brake 26, a third volume-pressure curve VPC for the right-rear brake 26, and a fourth volume-pressure curve VPC for the left-rear brake 26.

Figure 5:
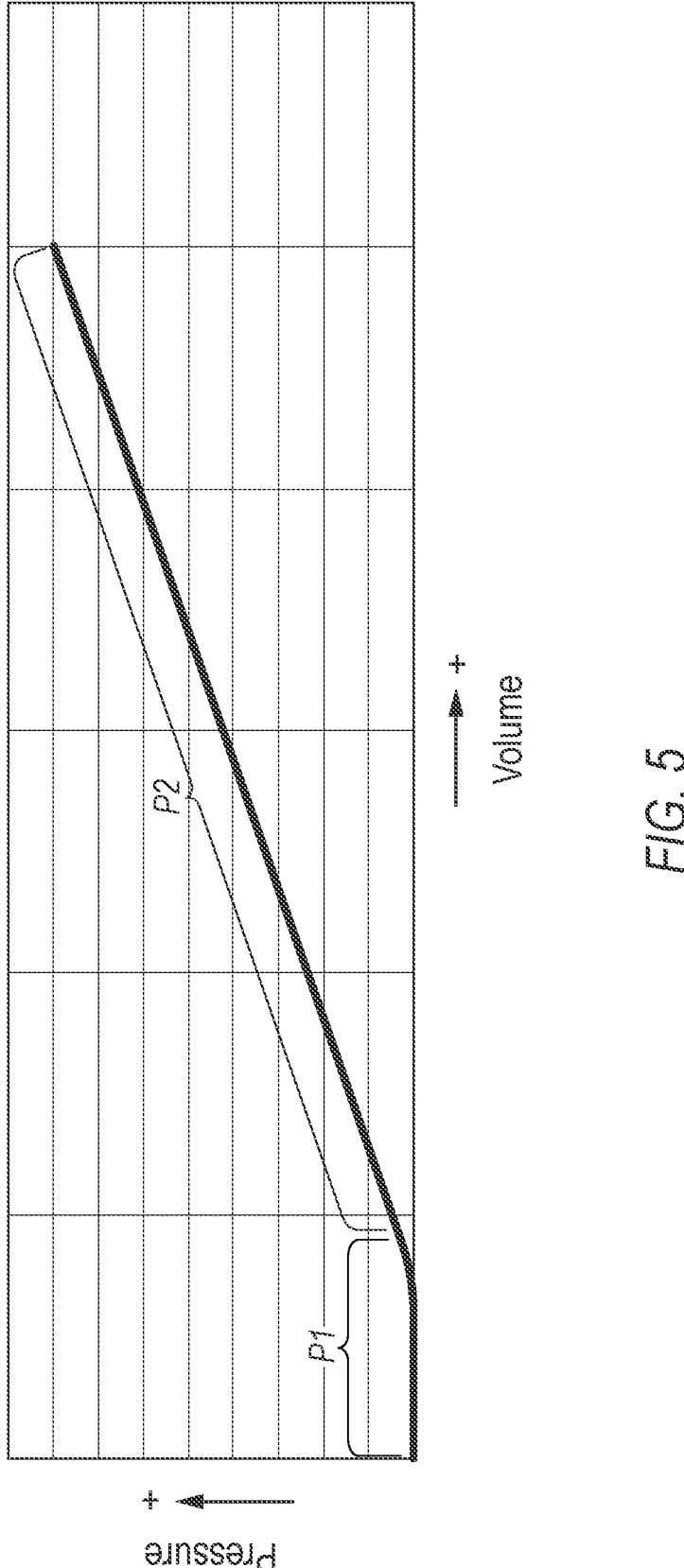
FIG. 5 is an example illustration of a volume-pressure curve.

With reference to FIG. 5, an example volume-pressure curve VPC is shown. The x-axis indicates volume of hydraulic fluid provided to a brake 26 and the y-axis indicates pressure of hydraulic fluid in such brake 26. As shown by the example curve, an increase in volume (movement to the right along the x-axis) generally results in an increase in pressure (upward movement along the y-axis).

The volume-pressure curve VPC includes a first portion P1 and a second portion P2. The first portion P1 corresponds to fluid provision prior to contact of the pad 44 with the disc 42 of the brake 26. The second portion P2 corresponds to fluid provision subsequent the pad 44 contacting the disc 42. A slope of the first portion P1 is less than a slope of the second portion P2. A width of the first portion P1, e.g., a length along the x-axis, is defined by a distance between the pad 44 and the disc 42 when the brake 26 is not actuated. Such distance may be referred to as the "knock-back" distance, e.g., the distance the pad 44 is knocked back from the disc 42 during operation of the vehicle 20.

The computer 30 may be programmed to determine the volume-pressure curves VPC, e.g., for each of the brakes 26 at each of the wheels 24. The computer 30 may determine the volume-pressure curve VPC for a certain one of the brakes 26 by actuating the hydraulic fluid source 28 to provide hydraulic fluid at a specified volumetric rate to such brake 26 and while detecting the pressure of the hydraulic fluid provided to such brake 26. The hydraulic fluid provided at the specified volumetric rate provides the determined x-axis component of the volume-pressure curve VPC. The detected pressure of the hydraulic fluid provides the determined y-axis component of the volume-pressure curve VPC.

The computer 30 may actuate the hydraulic fluid source 28 to provide hydraulic fluid at the specified volumetric rate, for example, by commanding the valve 48 between the pump 46 and the brake 26 for which the volume-pressure curve VPC is being determined to the open position, commanding the valves 48 between the pump 46 and the other brakes 26 to the closed positions, and commanding the pump 46 to provide hydraulic fluid, e.g., at the specified volumetric rate.

Prior to commanding the valves 48 between the pump 46 and the other brakes 26 to the closed positions, the computer 30 may command the pump 46 to provide hydraulic fluid, e.g., in an amount sufficient to increase hydraulic fluid pressure at the other brakes 26 to move the pad 44 into contact with the disc 42 and prevent rotation the wheels 24 at the other brakes 26. The computer 30 may then actuate the valves 48 between the pump 46 and the other brakes 26 to the closed positions, maintaining pressure of the hydraulic fluid at the other brakes 26 independent of further actuation of the pump 46.

The computer 30 may determine the volume-pressure curves VPC of the other wheels 24 by individually opening the valve 48 to each of the brakes 26 (and closing the other valves 48) and providing fluid at a specified volumetric rate while detecting the pressure of the hydraulic fluid provided, e.g., as described above. In other words, the computer 30 may determine the volume-pressure curve VPC for the brake 26 at the right-front wheel 24 by opening the valve 48 to such brake 26, closing the other valves 48, and providing fluid at a specified volumetric rate while detecting the pressure of the hydraulic fluid provided; the computer 30 may determine the volume-pressure curve VPC for the brake 26 at the left-front wheel 24 by opening the valve 48 to such brake 26, closing the other valves 48, and providing fluid at a specified volumetric rate while detecting the pressure of the hydraulic fluid provided, and so on. The computer 30 may store the determined the volume-pressure curves VPC, e.g., in memory and for use when commanding subsequent actuation of the brakes 26.

The computer 30 may be programmed to predict the first portion P1 of the volume-pressure curve VPC for the brake 26 at each of the wheels 24, e.g., during normal operation of the vehicle 20. In other words, the computer 30 may be programmed to predict an amount the pad 44 is knocked-back from the disc 42 of each brake 26. Normal operation of the vehicle 20 includes traveling in a forward direction, executing a turn, traveling on various road surfaces, etc. Normal operation of the vehicle 20 may affect the amount the pad 44 is knocked-back. For example, executing a turn, traveling a bumpy road, etc., may increase or decrease the amount the pad 44 is knocked-back, and the computer 30 may be programmed to predict such amount.

Figure 6:
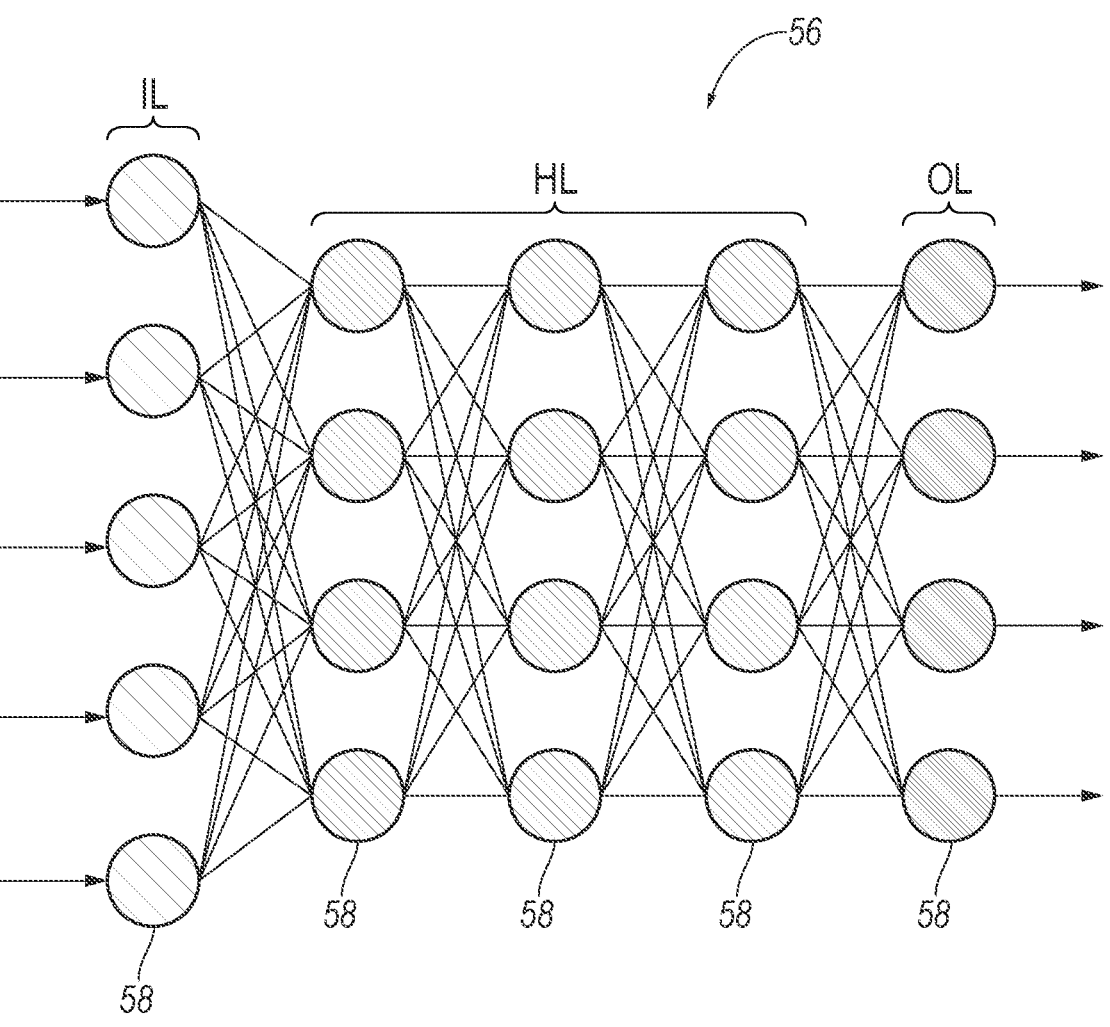
FIG. 6 is a schematic of a neural network for determining a portion of the volume-pressure curve.

The computer 30 may predict the first portion P1 of the volume-pressure curve VPC based on collected data, e.g., from the sensors 52, and using a trained deep neural network (DNN 56). In an example implementation, the DNN 56 can include, but is not limited to, a convolutional neural network CNN, R-CNN Region-based CNN, Fast R-CNN, and Faster R-CNN. The DNN 56 includes multiple nodes or neurons 58. As shown in exemplary FIG. 6, the neurons 58 are arranged so that the DNN 56 includes an input layer IL, one or more hidden layers HL, and an output layer OL. Each layer of the DNN 56 can include a plurality of neurons 58. While three hidden layers HL are illustrated, it is understood that the DNN 56 can include additional or fewer hidden layers HL. The input layer IL and output layer OL may also include more than one neurons 58. For example, the input layer IL may include a neuron 58 for each type of data input, e.g., a neuron 58 for the speed of the right-front wheel, a neuron 58 for the speed each of the wheels 24 wheel, a neuron 58 for magnitude of length of each of the dampers 40, a neuron 58 for lateral acceleration of the body 22, a neuron 58 for the wheel angle, etc. The output layer OL can include a neuron 58 for each brake 26, e.g., a neuron 58 for knock-back of the right-front brake 26, a neuron 58 for knock-back of the left front brake, etc. As one example, the DNN 56 can be trained with ground truth data, i.e., data about a real-world condition or state. For example, the DNN 56 can be trained with ground truth data and/or updated with additional data. Weights can be initialized by using a Gaussian distribution, for example, and a bias for each neuron 58 can be set to zero. Training the DNN 56 can include updating weights and biases via suitable techniques such as back-propagation with optimizations. Ground truth data means data deemed to represent a real-world environment, e.g., conditions and/or objects in the environment. More specifically the ground truth data can include at least one of, and as many as all of, steering angles, wheel angles, wheel speeds (including the wheel speeds of at least two wheels 24 of the plurality of wheels 24 and a different therebetween), movements of the dampers 40, and/or lateral body accelerations of the vehicle 20, and can include measured amounts of knock-back associated with such data. Thus, ground truth data can include sensor 52 data, including various combinations thereof as data for the input layer IL, along with a label or value describing the knock-back amount for the output layer OL. Ground truth data can further include or be specified by metadata such as a location or locations at which the ground truth data was obtained, a time of obtaining the ground truth data, equipment used to obtain the ground truth data, etc.

The collected data used with the DNN 56 to predict the first portion P1 of the volume-pressure curve VPC indicates at least one of, and as many as all of, detected steering angles, wheel angles, wheel speeds, damper movements, and/or lateral body accelerations of the vehicle 20. The various wheel speeds, e.g., at each of the wheels 24, may increase or decrease the knock-back depending on a magnitude of such speeds, a rate of change of such speeds, etc. The speeds of two of the wheels 24, may increase or decrease the knock-back, e.g., depending on an amount of difference therebetween. The difference between the wheel speeds may be indicative of lateral or other forces applied to the brakes 26 that may affect the amount of knock-back. Likewise, steering angles, wheel angles, and damper movements may be indicative of lateral or other forces applied to the brakes 26 that may affect the amount of knock-back. The data indicating the damper movements may include data indicating a magnitude of length change of the damper 40. Larger magnitudes of length change may be indicative of a larger amount of knock-back. Use of the DNN 56 to predict the first portion P1 of the volume-pressure may enable various combinations of the data to be accounted for, e.g., more accurately predicting the knock-back relative to other techniques that do not use a trained DNN 56.

The computer 30 may predict the first portion P1 of the volume-pressure curve VPC using only data collected after a most recent actuation of the at least one brake 26 of the plurality of brakes 26. For example, the collected data may not include data collected prior to the most recent actuation of the at least one brake 26 of the plurality of brakes 26. The knock-back of the brake 26 may reset after actuation. In other words, the pad 44 may return to a same position relative to the disc 42 after an actuation of the brake 26. Subsequent operation of the vehicle 20 may shift the pad 44 from such position, changing the amount of knock-back. Using only the data collected after a most recent actuation may account for such shift.

The computer 30 may be programmed to train the DNN 56 based on the predicted first portion P1 of the volume-pressure curve VPC, i.e., based on the predicted knock-back. For example, the collected data used to predict the first portion P1 of the volume-pressure curve VPC may be used as ground truth data for input later IL of the DNN 56, and a first portion P1 of a volume-pressure curve VPC measured upon actuation of the brake 26 after predicting the first portion P1 of the volume-pressure curve VPC may be used as ground truth data for the output layer OL of the DNN 56.

Figure 7:
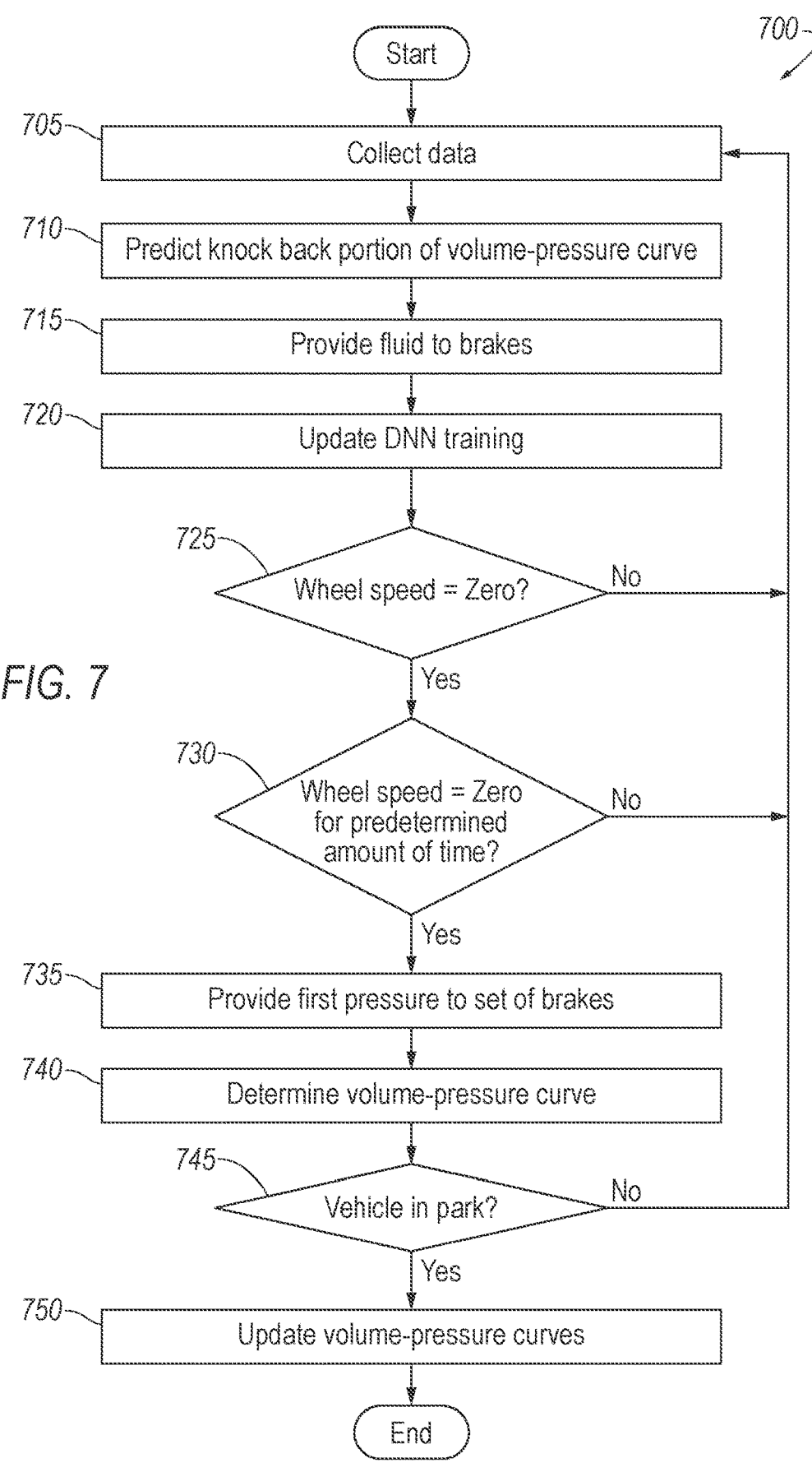
FIG. 7 is a flow chart illustrating a process for determining the volume pressure curve and controlling the brakes.

With reference to FIG. 7, a flow chart illustrating the process 700 for controlling the brakes 26 is shown. The process 700 starts, e.g., while the vehicle 20 is operating under normal conditions, at a block 705 where the computer 30 collects data, e.g., from the sensors 52, the user interface 50, etc., via the communication network 54. The computer 30 may collect such data continuously, at intervals (e.g., every 100 milliseconds), etc. The computer 30 may collect such data throughout the process 700. The collected data may indicate detected steering angles, wheel angles, wheel speeds of each of the plurality of wheels 24, damper movements (including data indicating a magnitude of length changes of the dampers 40), and/or lateral body accelerations of the vehicle 20. The computer 30 may store the collected data, e.g., in memory and along with data indicating times of data collection. At the block 705 the computer 30 includes stored, e.g., in memory, volume-pressure curves VPC.

At a block 710 the computer 30 predicts the knock-back portion (i.e., the first portion P1) of the volume-pressure curve VPC for at least one brake 26 of the plurality of brakes 26. The computer 30 may predict the volume-pressure curves VPC for each of the plurality of brakes 26. The computer 30 may predict the knock-back portion of the volume-pressure curves VPC based on collected data and using a trained DNN 56. The collected data used by the computer 30 with the trained DNN 56 may include as few as one of, to as many as all of, data indicating detected steering angles, wheel angles, wheel speeds (e.g., the wheel speeds of at least two wheels 24 of the plurality of wheels 24), damper movements (including data indicating magnitudes of length change of the dampers 40), and lateral body 22 acceleration, e.g., as described above. The collected data used by the computer 30 with the trained DNN 56 may include. data collected after a most recent actuation of the at least one brake 26 of the plurality of brakes 26, and may not include data collected prior to the most recent actuation of the at least one brake 26 of the plurality of brakes 26. The computer 30 may update the pressure volume-pressure curves VPC stored in memory with the predicted the knock-back portion. For example, the computer 30 may replace the first portion P1 of the stored volume-pressure curves VPC with the predicted the knock-back portions.

At a block 715 the computer 30 actuates the hydraulic fluid source 28 to provide hydraulic fluid to the brakes 26 to slow the vehicle 20, e.g., in response to operator input to a brake pedal or the computer 30 operating the vehicle 20 autonomously or semi-autonomously. The computer 30 actuates the hydraulic fluid source 28 to provide hydraulic fluid to the brakes 26 based on the stored volume-pressure curves VPC for the brakes 26 (including based on the knock-back portion predicted at the block 710). For example, the computer 30 may command the valves 48 to the open positions and command the pump 46 to provide fluid. The command to provide the fluid may be based on the stored volume-pressure curves VPC for the brakes 26, e.g., the rate of flow provided to by the pump 46, or the change of such rate, may be adjusted by the computer 30 depending on characteristics of the volume-pressure curves VPC. For example, the computer 30 may command the pump 46 to provide fluid at a first rate to move the pad 44 into contact with the disc 42, the amount of fluid required to move the pad 44 into contact with the disc 42 defined by the first portion P1 of the volume-pressure curves VPC. The computer 30 may command the pump 46 to provide fluid at a second rate after the pad 44 is in contact with the disc 42 to apply a specified force between the pad 44 and the disc 42, the amount of fluid required to apply the specified force defined by the second portion P2 of the curve. The first rate may be greater than the second rate. The computer 30 may provide hydraulic fluid to the brakes 26 based on the volume-pressure curves VPC for the brakes 26 to quickly engage the brakes 26, provide a more comfortable user experience, etc., e.g., as described herein and/or using known brake 26 actuation methodologies. The computer 30 may measure knock-back of at least one brake 26 of the plurality of brakes 26 while actuating the hydraulic fluid source 28 to provide hydraulic fluid. For example, while actuating the brakes 26, the computer 30 may collect data indicating the rate and/or amount of fluid provided to the brakes 26 and the pressures of the fluid and use such data to determine the actual knock-back of the brakes 26, e.g., as described herein.

Next, at block a 720 the computer 30 may update the training of the trained DNN 56, e.g., based on the measured knock-back of at least one of the brakes 26 and based on the collected data. For example, the computer 30 may use the collected data used for predicting the knock-back at the block 710 as ground truth data for the input layer IL and the actual knock-back determined at the block 715 as ground truth data for the output layer OL. The computer 30 may use other methodologies to update the training of the trained DNN 56 based on the measured knock-back of at least one of the brakes 26 and based on the collected data.

At a block 725 the computer 30 determines whether speeds of wheels 24 are zero, e.g., based on data from the sensors 52 and as described herein. In response to determining the speeds of the wheels 24 are zero, e.g., that the vehicle 20 is stopped, the computer 30 moves to a block 730. Otherwise, the computer 30 returns to the block 705, continuing to collect data, continuing to predict and update the knock-back of at least one of the brakes 26, continuing to update the training of the trained DNN 56, and continuing to monitor for whether speeds of wheels 24 are zero.

At the block 730 the computer 30 predicts whether the speeds of the wheels 24 will be zero for the predetermined amount of time, e.g., based on data from the sensors 52 and as described herein. For example, the computer 30 may determine the vehicle 20 will be stopped for the predetermined amount of time in response to receiving data from a GPS sensor or camera indicating that the vehicle 20 is at a stop light. As another example, the computer 30 may determine the vehicle 20 will be stopped for the predetermined amount of time in response to receiving data via V2V communications or I2V communications indicating that traffic would inhibit movement of the vehicle 20 for the predetermined amount of time. As another example, the computer 30 may determine the vehicle 20 will be stopped for the predetermined amount of time in response to the vehicle being in park mode. After the computer 30 predicts that the speeds of the wheels 24 will be zero for the predetermined amount of time, the computer 30 moves to a block 735. Otherwise, the computer 30 returns to the block 705, continuing to collect data and monitoring for whether speeds of wheels 24 are zero and will be zero for the predetermined amount of time. Alternately, the computer 30 may move to a block 745.

At the block 735, after determining the speeds of the wheels 24 are zero and after predicting that the speeds of the wheels 24 will be zero for the predetermined amount of time, the computer 30 actuates the hydraulic fluid source 28 to provide hydraulic fluid to a first set of one or more of the brakes 26 at the first pressure. The first set is less than all of the brakes 26. For example, the first set of brakes 26 may include three out of four of the brakes 26. The first pressure is sufficient to maintain the wheels 24 at the speed of zero, inhibiting motion of the vehicle 20, e.g., at a current road surface slope and powertrain torque level. For example, the computer 30 may command a first set of valves 48 connecting the pump 46 to the first set of brakes 26 to the open positions and, while the first set of valves 48 are at the open position, command the pump 46 to provide hydraulic fluid. The computer 30 may command the pump 46 to continue to provide hydraulic fluid until pressure at the first set of brakes 26 is at or above the first pressure, e.g., as detected by the sensors 52. Then, while the pressure at the first set of brakes 26 is above the first pressure, the computer 30 may actuate the first set of valves 48 to the closed positions, maintaining sufficient pressure at the first set of brakes 26 to inhibit motion of the vehicle 20. After the block 735 the computer 30 may move to a block 740.

At the block 740, and while sufficient pressure is maintained at the first set of brakes 26 to inhibit motion of the vehicle 20, the computer 30 determines a new volume-pressure curve VPC for the brake 26 not in the first set. For example, the computer 30 may actuate the pump 46 of the hydraulic fluid source 28 to provide hydraulic fluid at a specified volumetric rate to the brake 26 not in the first set of brakes 26 and detect the pressure of the hydraulic fluid provided to the brake 26 not in the first set of brakes 26. The computer 30 may determine the volume-pressure curve VPC for the brake 26 not in the first set based on the volumetric rate of the provided hydraulic fluid and based on the detected pressure of the provided hydraulic fluid, e.g., as described herein. The computer 30 may store the determined volume-pressure curve VPC for the brake 26 not in the first set, e.g., in memory. After the block 740 the computer 30 may move to the block 745. Alternately, before moving to the block 745, the computer 30 may iterate the block 735 and the block 740 with different sets of the brakes 26 to determine volume-pressure curves VPC for one or more of the other brakes 26. For example, the computer 30 may actuate the hydraulic fluid source 28 to provide hydraulic fluid to a second set of one or more of the brakes 26 at the first pressure sufficient to maintain the wheels 24 at the speed of zero, e.g., as described herein for the first set of brakes 26. The first set of brakes 26 and the second set of brakes 26 are different. For example, the first set of brakes 26 may exclude the right-front wheel 24 and the second set of brake 26 may exclude the left-front wheel 24. The computer 30 may actuate the hydraulic fluid source 28 to provide hydraulic fluid at a volumetric rate to a brake 26 not in the second set and detect the pressure of such hydraulic fluid, e.g., while the valves 48 between the pump 46 and the second set of brakes 26 are in the closed positions. The computer 30 may determine the volume-pressure curve VPC for the brake 26 not in the second set based on the volumetric rate and the detected pressure of the hydraulic fluid provided to the brake 26 not in the second set at the volumetric rate, e.g., as described herein. The computer 30 may store the determined volume-pressure curve VPC for the brake 26 not in the second set, e.g., in memory. The computer 30 may iterate the block 735 and the block 740 with third and fourth sets of brakes 26, e.g., to determine volume-pressure curves VPC for each the four brakes 26, and then move to the block 745. The determined volume-pressure curves VPC may update, e.g., replace, volume-pressure curves VPC previously stored in memory. The computer 30 may terminate iteration of the block 735 and the block 740 and move to the block 745 prior to determining volume-pressure curves VPC for all brakes 26, e.g., when an operator removes pressure from the brake pedal, when the operator commands acceleration of the vehicle 20, and/or when the computer 30 commands acceleration of the vehicle 20 or disengagement of the brakes 26, prior to such determinations being completed.

At the block 745 the computer 30 determines whether the vehicle 20 is in the park mode, e.g., based on data from the sensor 52, the user interface 50, etc., as described herein. In response to determining the vehicle 20 is in the park mode the computer 30 moves to a block 750. Else, the computer 30 may return to the block 705, repeating the process 700 to maintain updated volume-pressure curves VPC for the brakes 26 in memory.

At the block 750 the computer 30 updates the volume-pressure curves VPC for all of the brakes 26. For example, the computer 30 may actuate the hydraulic fluid source 28 to provide hydraulic fluid at a volumetric rate to at least one of the brakes 26. The computer 30 may provide fluid to the brakes 26 individually, e.g., by first commanding one of valves 48 the open position and the valves 48 to the closed position, then commanding another of the valves 48 to the open position and the others to the closed positions, etc. While providing hydraulic fluid at the volumetric rate to the brakes 26, the computer 30 may the detect pressures of the fluid provide to the brakes 26. The computer 30 may determine the volume-pressure curves VPC for the brakes 26 based on the volumetric rate and the detected pressures, e.g., as described herein. After the block 750, the process 700 may end.

In the drawings, the same reference numbers indicate the same elements. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted.

The adjectives first and second are used throughout this document as identifiers and, unless explicitly stated otherwise, are not intended to signify importance, order, or quantity.

Computer executable instructions may be compiled or interpreted from computer programs created using a variety of programming languages and/or technologies, including, without limitation, and either alone or in combination, Java, C, C++, Visual Basic, Java Script, Perl, HTML, etc. In general, a processor e.g., a microprocessor receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random-access memory, etc. A computer readable medium includes any medium that participates in providing data e.g., instructions, which may be read by a computer. Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Use of in response to, based on, and upon determining herein indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:
1. A vehicle, comprising:
a vehicle body;
a plurality of wheels supported by the vehicle body;
a plurality of brakes operatively coupled to the wheels to control speeds of the wheels;
a hydraulic fluid source in fluid communication with the brakes; and
a computer having a processor and a memory storing instructions executable by the processor to:
determine that speeds of the wheels are zero;

after determining the speeds of the wheels are zero, actuate the hydraulic fluid source to provide hydraulic fluid to a first set of one or more of the brakes at a first pressure sufficient to maintain the wheels at the speed of zero and to provide hydraulic fluid at a volumetric rate to one or more of the brakes not in the first set;

while providing hydraulic fluid at the volumetric rate to a brake not in the first set, detect second pressures of the brake not in the first set; and based on the volumetric rate and the second pressures, determine a volume-pressure curve defining brake pressure as a function of hydraulic fluid volume delivered to the brake not in the first set.

2. The vehicle of claim 1, wherein the instructions include instructions to actuate the hydraulic fluid source to provide hydraulic fluid to the brake not in the first set based on the volume-pressure curve for the brake not in the first set.

3. The vehicle of claim 1, wherein the instructions include instructions to:

after determining the volume-pressure curve for the brake not in the first set, provide hydraulic fluid to a second set of one or more of the brakes at the first pressure sufficient to maintain the wheels at the speed of zero and to provide hydraulic fluid at a volumetric rate to a brake not in the second set, while providing hydraulic fluid at the volumetric rate to the brake not in the second set, detecting third pressures of the brake not in the second set, and determine a second volume-pressure curve for the brake not in the second set based on the volumetric rate and the third pressures.

4. The vehicle of claim 3, wherein the first set and the second set are different.

5. The vehicle of claim 1, wherein the hydraulic fluid source includes a pump and a plurality of valves operatively coupled between the pump and the brakes to control fluid flow from the pump to the brakes.

6. The vehicle of claim 5, wherein the instructions to actuate the hydraulic fluid source to provide hydraulic fluid to the first set of one or more of the brakes at the first pressure include instructions to:

while a first set of one or more of the valves connecting the pump to the first set of one or more of the brakes are at an open position, actuating the pump to provide hydraulic fluid to the first set of one or more of the brakes at the first pressure, and then, actuating the first set of valves to a closed position.

7. The vehicle of claim 6, wherein the instructions include instructions to actuate the pump to provide hydraulic fluid at the volumetric rate to the brake not in the first set and detect the second pressures of the brake not in the first set while the first set of valves are at the closed position.

8. The vehicle of claim 1, wherein each of the brakes includes a disc, and brake pad, and a caliper operative to control movement of the brake pad relative to the disc.

9. The vehicle of claim 8, wherein the volume-pressure curve includes a first portion corresponding to movement of the pad prior to contact with the disc and a second portion subsequent to the pad contacting the disc.

10. The vehicle of claim 1, wherein the instructions include instructions to, in response to determining the speeds of the wheels are zero and before actuating the hydraulic fluid source to provide hydraulic fluid to the first set of one or more of the brakes at the first pressure, predict that the speeds of the wheels will be zero for a predetermined amount of time.

11. A vehicle, comprising:

a vehicle body;

a plurality of wheels supported by the vehicle body;

a plurality of brakes operatively coupled to the wheels to control speeds of the wheels; a hydraulic fluid source in fluid communication with the brakes; and a computer having a processor and a memory storing instructions executable by the processor to:

determine the vehicle is in a park mode;

in response to determining the vehicle is in the park mode, actuate the hydraulic fluid source to provide hydraulic fluid at a volumetric rate to one of the brakes, while providing hydraulic fluid at the volumetric rate to the one of the brakes, detect pressures of the one or more of the brakes; and based on the volumetric rate to the one of the brakes and the pressures of the one or more of the brakes, determine a volume-pressure curve defining brake pressure as a function of hydraulic fluid volume delivered to the one of the brakes.

12. The vehicle of claim 11, wherein the instructions include instructions to actuate the hydraulic fluid source to provide hydraulic fluid to the one of the brakes based on the volume-pressure curve for the one of the brakes.

13. The vehicle of claim 11, wherein the instructions include instructions to:

after determining the volume-pressure curve for the one of the brakes, provide hydraulic fluid to a second of the brakes at the volumetric rate, while providing hydraulic fluid at the volumetric rate to the second of the brakes, detect second pressures of the second of the brakes, and determine a second volume-pressure curve for the second of the brakes based on the volumetric rate and the second pressures.

14. The vehicle of claim 11, wherein the hydraulic fluid source includes a pump and a plurality of valves operatively coupled between the pump and the brakes to control fluid flow from the pump to the brakes.

15. The vehicle of claim 14, wherein the instructions to actuate the hydraulic fluid source to provide hydraulic fluid at a volumetric rate to the one of the brakes includes instructions to command a valve of the plurality of valves corresponding to the one of the brakes to an open position and valves of the plurality of valves corresponding to another one or more of the brakes to a closed position.

16. The vehicle of claim 11, wherein each of the brakes includes a disc, and brake pad, and a caliper operative to control movement of the brake pad relative to the disc.

17. The vehicle of claim 16, wherein the volume-pressure curve includes a first portion corresponding to movement of the pad prior to contact with the disc and a second portion subsequent to the pad contacting the disc.

18. A method, comprising:

determining that speeds of wheels of a vehicle are zero;

after determining the speeds of the wheels are zero, actuating a hydraulic fluid source to provide hydraulic fluid to a first set of one or more of the brakes at a first pressure sufficient to maintain the vehicle body at a present position and to provide hydraulic fluid at a volumetric rate to one or more of the brakes not in the first set;

while providing hydraulic fluid at the volumetric rate to a brake not in the first set, detecting second pressures of the brake not in the first set;

based on the volumetric rate to the brake not in the first set and the second pressures of the brake not in the first set, determining a volume-pressure curve for the brake not in the first set; and actuating the brake not in the first set based on the volume-pressure curve.

19. The method of claim 18, wherein actuating the hydraulic fluid source to provide hydraulic fluid to the first set of one or more of the brakes at the first pressure includes, while a first set of one or more valves connecting a pump to the first set of one or more of the brakes are at an open position, actuating the pump to provide hydraulic fluid to the first set of one or more of the brakes at the first pressure, and, then, actuating the first set of valves to a closed position.

20. The method of claim 18, wherein the volume-pressure curve includes a first portion corresponding to movement of a brake pad prior to contact with a brake disc and a second portion subsequent to the brake pad contacting the brake disc.

\* \* \* \* \*